United States Patent Office 3,640,876
Patented Feb. 8, 1972

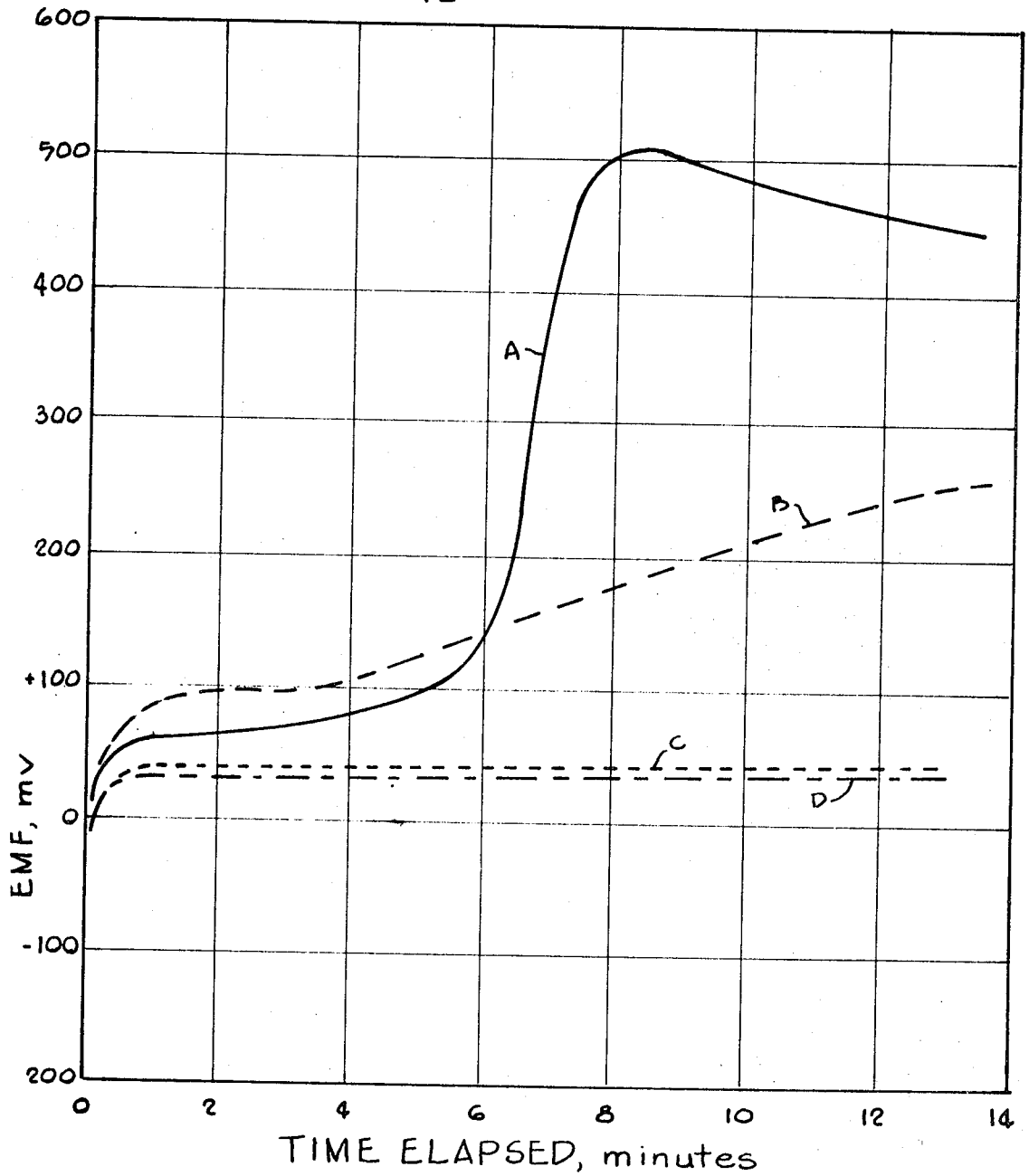

3,640,876
PEROXYGEN COMPOSITION CONTAINING AN ALKALI METAL SILICATE AND AN ORGANIC ACID ANHYDRIDE
Faye J. Donaghu, Buena Park, Calif., assignor to Kerr McGee Chemical Corp.
Filed Sept. 23, 1968, Ser. No. 761,708
Int. Cl. C01b 15/00; C11d 7/14, 7/54
U.S. Cl. 252—99
14 Claims

ABSTRACT OF THE DISCLOSURE

A method of increasing the oxidation potential of a water-soluble inorganic peroxy compound which is capable of forming hydrogen peroxide in an aqueous medium which comprises incorporating with said peroxy compound in said aqueous medium a water-soluble alkali metal silicate and an organic acid anhydride which is capable of reacting with said peroxy compound in said aqueous medium to form a peroxyacid of said acid anhydride. The combination of at least one alkali metal silicate and at least one organic acid anhydride with at least one inorganic peroxy compound provides a composition which interacts synergistically in an aqueous medium to provide active oxidative species of unexpectedly high oxidation potential. The oxidizing solution thus produced is an effective oxidative bleaching solution even at relatively mild temperatures.

BACKGROUND OF THE INVENTION

(1) Field of the invention

This invention relates to a method of providing an aqueous solution having a high oxidation potential and to a novel composition which, when added to an aqueous medium provides oxidative species of unexpectedly high oxidation potential. More particularly, the invention relates to a method of increasing the oxidation potential of a water-soluble inorganic peroxy compound in an aqueous medium.

(2) Description of the prior art

It is known that peroxy compounds such as hydrogen peroxide, sodium peroxide, sodium perborate, sodium percarbonate and the like can be used in an aqueous medium as an oxidative bleach. However, such peroxy compounds when dissolved in an aqueous medium generally require high temperatures and extended periods of time to reach an oxidation potential sufficiently high to be useful as a bleach. Thus while the peroxy compounds are effective oxidative bleaches when used at temperatures at or near boiling for extended periods of time, that is up to about an hour or more, they are not very effective when used at relatively mild temperatures, that is, below about 60° C. for short periods of time. Consequently such peroxy compounds have never achieved widespread acceptance as oxidative bleaches in those areas in which bleaching is done at relatively mild temperatures and in short periods of time.

Considerable effort has been expended heretofore to provide an activator for peroxy compounds which will increase the oxidation potential of the peroxy compound particularly at mild temperatures to thereby permit the peroxy compound to be used as an oxidative bleach at such mild temperatures. However, none of the activators which have been proposed heretofore has been completely satisfactory. For example, it has been suggested that the oxidizing and bleaching activity of an inorganic peroxy compound in an aqueous medium may be increased by adding an organic acid anhydride with the peroxy compound. While the combination of an organic acid anhydride with the peroxy compound does provide an oxidizing solution of somewhat higher activity than that obtained from the peroxy compound alone, the increase in oxidation potential provided by such a combination is not sufficiently great and does not occur rapidly enough for many oxidizing and bleach applications.

SUMMARY OF THE INVENTION

It has now been discovered that the oxidation potential of an inorganic peroxy compound in an aqueous medium may be increased to an unexpectedly high value by incorporating with the peroxy compound in the aqueous medium at least one water-soluble alkali metal silicate and at least one organic acid anhydride which is capable of reacting with the peroxy compound to form a peracid of the acid anhydride. Thus, it has been found that the combination of a water-soluble alkali metal silicate and certain organic acid anhydrides with an inorganic peroxy compound provides a composition which interacts synergistically in an aqueous medium to provide oxidative species of unexpectedly high oxidation potential. The synergistic reaction between the silicate, the acid anhydride and the peroxy compound produces oxidative species of higher oxidation potential than the peroxy compound alone or in combination with either the silicate or the acid anhydride. This high potential oxidative species is rapidly formed even at relatively mild temperatures, that is, below about 60° C. and reaches its peak of greatest oxidation potential within a relatively short period of time.

DESCRIPTION OF THE PREFERRED EMBODIMENTS

The composition of the present invention comprises at least one water-soluble peroxy compound capable of forming hydrogen peroxide in an aqueous medium, at least one water-soluble alkali metal silicate and at least one organic acid anhydride capable of reacting with said peroxy compound in an aqueous medium to form a peroxy acid of the acid anhydride. It has been found that these constituents combine synergistically when added to water or aqueous liquids to produce active oxidative species having an unexpectedly high oxidation potential. Thus, the addition of the composition to an aqueous medium produces a shift in oxidation potential of greater intensity and speed than occurs when the peroxy compound is added to the aqueous medium alone or together with either the silicate or acid anhydride.

The mechanism of this synergistic reaction is not completely understood. It is believed that the addition of the peroxy compound, the acid anhydride and the alkali metal silicate to an aqueous medium provides three active oxidative species in the aqueous medium; namely a peroxy compound; a peroxy acid of the acid anhydride formed by the reaction of the acid anhydride with some of the peroxy compound of the composition; and a high potential oxidative species produced by the interaction of the perborate, the acid anhydride and the alkali metal silicate, possibly a peroxysilicate. The interaction must involve all three constituents in order to obtain the desired synergistic effect. However, as will be discussed in more detail hereinbelow, not all inorganic peroxy compounds interact synergistically with an alkali metal silicate and an organic acid anhydride in this manner. Similarly, not all organic acid anhydrides are capable of providing the desired synergistic reaction. The present invention provides the additional advantage that the constituents of the composition react rapidly in an aqueous medium, even at mild temperatures, and achieve a peak of highest oxidation potential within a relatively short period of time.

The composition of this invention is an effective oxidation bleach. The effectiveness of an oxidative bleach is related to the oxidation potential of the bleach active species and the concentration of the oxidative species in the aqueous bleaching solution. Generally, the higher the oxidation potential of the bleach active species the better the bleaching effectiveness of the composition. Since the composition of this invention provides oxidative species having a high oxidation potential and these oxidative species are formed rapidly upon addition of the composition to an aqueous medium, to provide a high concentration of the oxidative species in the bleaching solution, the composition is particularly useful as an oxidative bleach. A bleaching solution utilizing the composition of this invention may be prepared merely by adding the constituents, separately or in admixture, to water or other aqueous liquids. Generally, a sufficient amount of the composition should be introduced into the aqueous medium to provide a bleaching solution containing at least about 0.2 gm. of peroxy compound per liter of solution.

As discussed hereinabove, the peroxy compound interacts with the acid anhydride and the alkali metal silicate in an aqueous medium to produce a high potential oxidative species believed to be a peroxysilicate. However, not all peroxy compounds enter into this reaction. The reaction is effected only by peroxy compounds which are capable of forming hydrogen peroxide in solution. Accordingly, per compounds which do not form hydrogen peroxide in solution, such as persulfates, perchlorates, permanganates and the like, are not suitable for use in the present invention. Peroxy compounds which may be used, either singly or in combination, include hydrogen peroxide; alkali metal and alkaline earth metal peroxides; alkali metal and alkaline earth metal perborates; salts of peroxyacids such as peroxycarbonates, peroxyphosphates and the like; and peroxyhydrates such as phosphate peroxyhydrates, sodium carbonate peroxyhydrates and the like. The peroxy compound used must be relatively stable at room temperatures so that no significant loss of active oxygen content occurs during storage. Usually it is preferred to use peroxy compounds which are available as solids so that a stable, dry composition may be provided.

The peroxy constituent preferably used in this invention is an alkali metal perborate and more particularly sodium perborate. Both the tetrahydrate and monohydrate form of sodium perborate may be used since both are available commercially in crystalline or powder form and have good storage stability.

When it is desired to use the composition of this invention as an oxidative bleach, the amount of peroxy constituent in the composition may vary within wide limits. Thus, the composition may contain between about 10% and 60% by weight of the peroxy compound, with amounts between 25% and 50% by weight being preferred.

The alkali metal silicate constituent of the composition preferably is sodium metasilicate, which may be used in either its anhydrous form or in a hydrated form, such as the pentahydrate or octahydrate. Other water-soluble alkali metal silicates may, of course, also be used. Thus, for example, other water-soluble sodium silicates such as sodium orthosilicate, sodium sesquisilicate, disodium disilicate, and the like; water-soluble potassium silicates such as potassium metasilicate, potassium disilicate and the like; and other alkali metal silicates which are soluble in water may be used in the present invention, either singly or in combination.

As discussed hereinabove, the silicate interacts with the peroxy constituent in the presence of the acid anhydride when the composition is added to an aqueous medium, to form an active oxidative species, probably a peroxysilicate. The speed with which this reaction occurs in the aqueous medium is dependent in part on the concentration of the silicate constituent in the composition. In order to obtain the desired increase in oxidation potential of the peroxy compound and have the increase occur in a relatively short period of time it is generally preferred that the composition contain at least about 0.02 part by weight of the alkali metal silicate per part by weight of the peroxy compound in the composition. When at least this amount of the silicate is present in the composition, the active oxidative species reaches its peak of oxidative potential within relatively short period of time after addition of the composition to the aqueous medium. Lesser concentrations of the silicate may be used if longer reaction times are not undesirable. Similarly, greater concentrations of the silicate, that is about 0.1 part by weight or more of the silicate per part of the peroxy compound may also be used to provide a shorter reaction time. When it is desired to use the composition of this invention as an oxidative bleach, the amount of the alkali metal silicate in the composition may vary within wide limits. Thus, the composition may contain between about 0.2% and 6% by weight of the silicate constituent.

The acid anhydrides which may be used in the present invention are organic acid anhydrides which are capable of reacting with the peroxy constituent of the composition in an aqueous medium to form a peracid of the acid anhydride. The presence of a peracid in an aqueous medium may be determined by the "per-acid formation test" described in U.S. Pat. No. 2,955,905, when an acid anhydride is substituted for the esters used in the test procedure described in that patent. Such acid anhydrides, when combined with the alkali metal silicates set forth above, increase the oxidation potential of the inorganic peroxy compound to an unexpectedly high value.

Suitable organic acid anhydrides which may be used in this invention, either singly or in combination, include, for example, acetic anhydride
propionic anhydride
n-butyric anhydride
iso-butyric anhydride
valeric anhydride
phthalic anhydride
glutaric anhydride
succinic anhydride and the like.

Derivatives of such organic acid anhydrides may also be used. Thus, lower alkyl derivatives, for example, methyl maleic anhydride, methyl glutaric anhydride, methyl succinic anhydride and halogen derivatives, for example tetrachlorophthalic anhydride and other suitable derivatives capable of reacting with the peroxy compound to form a peracid may also be used in the invention. It will be understood that any organic acid anhydride and derivative thereof, capable of reacting with the peroxy constituent in an aqueous medium to form a peroxy acid, may be employed in the composition of the present invention. Usually, it is preferred to use acid anhydrides which are available as solids, so that the composition may be provided in dry, free-flowing solid form. However, organic acid anhydrides which are available as liquids may also be used if desired.

The unexpectedly high increase in oxidation potential of the peroxy compound has been found to result when the organic acid anhydride is present in an amount of from about 0.75 to about 10 parts by weight of the acid anhydride per part by weight of the peroxy compound. Generally it is preferred to use a 1:1 molar ratio of the acid anhydride to peroxy compound. When it is desired to use the composition of this invention as an oxidative bleach, the amount of the organic acid anhydride in the composition may vary within the limits. Thus, the composition may contain between about 30% and 90% by weight of the acid anhydride.

According to a preferred embodiment of the present invention, each of the constituents of the composition is in a dry, particulate form so that a dry, stable composition is provided. The constituents of this preferred dry composition may be either anhydrous or in a hydrated state as long as they do not contain sufficient free or uncombined water to interfere with the obtainment of the dry mixture. Thus the composition does not contain water in an amount sufficient to permit chemical reaction of the constituents prior to use. Such a dry, stable composition facilitates the preparation, storage, handling and use of the composition and provides a compostion particularly suitable for use as a bleach since a bleaching solution may be formed merely by adding the composition to water or other aqueous liquid.

When such particulate constituents are used, the dry composition may be prepared by any suitable method which provides an intimate mixture of the peroxy compound, the silicate and the acid anhydride, such as for example, stirring, tumbling, dry blending and the like. The constituents may be admixed in any order. The dry composition has satisfactory stability for commercial storage, shipment and handling without danger of decomposition. Such a dry composition may be packaged in paper, plastic or other suitable material, such as water-soluble polyvinyl alcohol packets, which exclude the presence of water.

The use of one or more non-aqueous liquid constituents of the composition is also within the scope of this invention. When such liquid constituents are employed they are preferably introduced separately into the aqueous medium to provide an oxidizing solution. However, each of the constituents of the composition must be introduced into the aqueous medium substantially simultaneously in order to obtain the desired, unexpectedly high increase in oxidation potential of the peroxy compound.

According to an embodiment of the present invention, the composition of this invention, when provided as a dry, free-flowing composition, may be admixed with an organic surface active agent having detergent properties to provide washing compositions having improved oxidizing and bleaching properties. The organic surface active agent used in such combined washing and bleaching compositions may be any water soluble cationic, anionic or nonionic compound having detergent properties. Examples of suitable materials which may be used with the composition include soaps, such as the alkali metals salts of fatty acids such as stearic and palmitic acids, or of rosin acids such as abeitic acid; cationic surface active agents such as long-chain quaternary ammonium salts and salts of higher alkylamines, for example, cetyl pyridium chloride, cetyltriethyl ammonium chloride and the like; synthetic anionic surface active agents such as alkyl aryl sulfonates, sulfated alcohols for example, sodium dodecyl and hevadecyl sulfates, and the like, sodium salts of sulfated monoglycerides, sulfated and sulfonated fatty oils, acids or esters, for example sodium salts of sulfonated castor oil and sulfated red oil, and the like; and nonionic surface active agents such as polyoxyethylene ethers of alkyl phenols, polyoxyethylene esters of fatty acids and the like.

The quantity of surface active agents contained in the washing and bleaching composition of this embodiment can vary within wide limits but, for practical purposes, should be sufficient for efficient soil removal. Thus, in the dry washing and bleaching composition the surface active agent content can be between about 5% and 80% by weight of the composition. Preferably, the surface active agent is present in amounts ranging from about 5% to 50% by weight of a dry composition.

In addition the washing and bleaching composition of this embodiment of the invention can include various other substances generally empoyled in such washing compositions, provided that the use of any such materials does not adversely affect the desired properties of the composition. Examples of suitable materials includes hydrotropic stabilizing agents such as sodium xylene and toluene sulfonates; soil-suspending agents such as the combination of sodium carboxymethylcellulose and polyvinyl alcohol; optical or fluorescent brightener materials such as those of the triazole or benzidene sulfane type; germicides; coloring agent; perfumes; and the like.

Such dry washing and bleaching compositions are stable during storage and can be prepared by conventional dry blending techniques. Preferably all the ingredients, except the dry oxidizing composition, are prepared in particulate form by heat drying an aqueous slurry, such as by spray drying or drum drying at temperatures of about 100° C., and the dry oxidizing composition is then blended with the heat dried composition.

The following examples are set forth to further illustrate, not to limit, the invention, whereby those skilled in the art may understand better the manner in which the present invention can be carried into effect. In the instant specification, appended claims and the following specific examples, all parts and percentages are by weight unless otherwise indicated.

EXAMPLE 1

In this example, a comparison was made of several compositions, one of which is typical of the improved oxidizing composition of this invention. The composition oxidizing composition of this invention. The compositions compared were:

(A) The oxidizing composition of the present invention containing 20 parts by weight of sodium perborate, 20 parts by weight of phthalic anhydride and 1 part by weight of sodium metasilicate;

(B) 20 parts by weight of sodium perborate and 20 parts by weight of phthalic anhydride;

(C) 20 parts by weight of sodium perborate and 1 part by weight of sodium metasilicate; and (D) Sodium perborate alone.

The compositions were formed by dry mixing the stated ingredients, each of which was in dry, particulate form.

Compositions A through D were subjected to an electrometric test for measuring the potential (electromotive force) of oxidative species in solution. It has been found that, in general, the actual bleaching ability of a compound or composition is proportional to the oxidative shift in potential when the composition is put in solution. Thus, any compound or composition which produces a strong oxidative shift in potential, that is, electromotive force, without significant lowering of the pH, is considered to provide a good oxidative bleach.

A standard procedure was followed in evaluating each of these compositions. Thus, a measured amount of the composition being tested was introduced into 200 ml. of a buffer solution of 0.01 M $Na_2B_2O_4$ in an amount sufficient to provide a concentration of 1 gm. perborate per liter. The temperature of the solution was maintained at about 50° C. throughout the test period. The electrochemical potential shift of the solution formed by the composition being tested was measured using platinum-saturated Calomel electrodes. In addition, a glass Calomel electrode was provided in the solution and connected to the recording potentiometer so that changes in pH could be followed. The change in EMF for each composition was measured in this manner for about 15 minutes.

The results of this test are illustrate in the figure wherein a series of curves are shown. EMF measurements are plotted as the ordinate and time, in minutes, is plotted as the abscissa in the figure. The curves identified by "A," "B," "C" and "D" were obtained by testing compositions A through D, respectively.

The results of this test clearly show the unexpected synergistic effect of EMF of the oxidizing composition of this invention, Thus, the combination of sodium metasilicate with sodium perborate (curve C) provides no significant increase in oxidation potential over the use of sodium perborate alone (curve D). The combination of phthalic anhydride with the perborate (curve B) results in only a slight oxidative shift in potential. The combination of the metasilicate and the acid anhydride with the perborate (curve A), the composition of this invention, provides relatively high oxidative shift in potential. This shift in potential is substantially greater than would be expected from the combination of the three constituents. The composition reached its greatest peak of oxidative potential in about 8 minutes. This particularly advantageous since it is well within the 15 minute time period generally used in home laundry practices. In addition, the pH of the solution to which composition A was added remained at about 9.4 throughout the test period. These results clearly show that the oxidation potential of a peroxy compound may be increased to an unexpectedly high value when an alkali metal silicate and an organic acid anhydride are added with the peroxy compound to an aqueous medium.

Compositions A through D were then tested in a standard colorimetric test in order to compare the ability of the compositions in bleaching a standard colored solution. In this colorimetric test a standard colored buffer solution containing 0.01 M $Na_2B_2O_4$ was used for evaluating each composition. In one series of tests, a standard chlorophyll solution was used and in another series, a standard tea solution was used. The following procedure was used in both series of tests for each composition tested. The percent transmittance of the standard colored solution was first measured at 500 millimicrons on a spectrophotometer. The composition being evaluated was then added with agitation to the colored solution at the test temperature in an amount sufficient to provide a concentration of 1 gm. perborate per liter. One series of tests was conducted with the solution at 25° C. and another with the solution at 50° C. The percent transmittance of the colored solution was measured 5 minutes and again 15 minutes after addition of the composition being evaluated. The result of this test procedure are set forth below in Table I.

TABLE I
Chlorophyll Solution

| Composition tested | Percent transmittance | | | | |
|---|---|---|---|---|---|
| | Original | After 5 minutes at— | | After 15 minutes at— | |
| | | 25° C. | 50° C. | 25° C. | 50° C. |
| A | 52 | 65 | 65 | 69 | 74 |
| B | 52 | 61 | 64 | 66 | 70 |
| C | 52 | | 53 | | 54 |
| D | 52 | 53 | 54 | 53 | 56 |

Tea Solution

| A | 36 | 59 | 68 | 66 | 76 |
| B | 36 | 57 | 66 | 64 | 76 |
| C | 36 | | 42 | | 47 |
| D | 36 | 38 | 44 | 40 | 48 |

In this colorimetric test, an increase in percent transmittance is indicative of bleaching of the colored solution and provides some indication of the bleaching ability of a composition. However, change in percent transmittance is not a direct measure of bleaching efficiency for it has been found, for example, that a 3% increase in percent transmittance for a chlorophyll solution represents more than a 20% improvement in bleaching efficiency.

This series of tests clearly shows that the composition of this invention, composition A, effectively bleached the colored solutions, as shown by the marked increase in percent transmittance even when the bleaching is carried out at mild temperatures over a relatively short period of time.

Another series of tests was run in order to demonstrate the effectiveness of other acid anhydrides in the oxidizing composition of this invention. In this series of tests, each composition evaluated contained 0.2 gm. sodium perborate, 0.01 gm. sodium metasilicate, and a measured amount of an organic acid anhydride. The acid anhydrides tested and the amount of anhydride used are set forth in Table II. Each composition evaluated was introduced into 200 ml. of a 0.01 M $Na_2B_2O_4$ buffer solution.

Each of the compositions evaluated was subjected to the electrometric test for measuring changes in potential, as described in Example 1. The standard procedure described in that example was also followed, with the exception that when the acid anhydride being tested was a liquid, it was separately introduced into the buffer solution. However, all three components were introduced substantially simultaneously into the buffer solution. In each test the amount of the composition introduced into the solution was sufficient to provide a concentration of about 1 gm. perborate per liter of soluion. The maximum change in EMF for each composition and the time required to effect that change are set forth in Table II.

TABLE II

| Example No. | Acid anhydride | Amount anhydride (gm.) | Maximum change in EMF (mv.) | Time to reach maximum EMF (min.) |
|---|---|---|---|---|
| 2 | Acetic anhydride | 0.13 | >450 | 0.5 |
| 3 | Propionic anhydride | 0.17 | >450 | 4 |
| 4 | n-Butyric anhydride | 0.21 | >450 | 4 |
| 5 | Iso-butyric anhydride | 0.21 | >450 | 26 |
| 6 | Methyl maleic anhydride | 0.15 | >450 | 1 |
| 7 | Methyl glutaric anhydride | 0.17 | >450 | 7 |
| 8 | Methyl succinic anhydride | 0.15 | >450 | 10 |
| 9 | Tetrachlorophthalic anhydride | 0.37 | >450 | 35 |
| 10 | Valeric anhydride | 0.24 | >450 | 40 |

Thus, each of the compositions evaluated produced a high oxidative shift in potential.

EXAMPLES 11 AND 12

Another series of tests was conducted to show that the acid anhydride to peroxy ratio in the compositions of this invention may be varied widely. Thus, two compositions were prepared by dry mixing the ingredients to form a physical blend. Each composition was subjected to the electrometric test according to the procedure described in Example 1. Both compositions tested contained about 2% by weight sodium metasilicate, about 48% by weight borax and about 50% by weight of a combination of sodium perborate and phthalic anhydride. In the composition of Example 11, the perborate and phthalic anhydride were present in a weight ratio of 10 parts phthalic anhydride to 1 part sodium perborate. In the composition of Example 12 these materials were present in a weight ratio of about 0.75 part phthalic anhydride to 1 part sodium perborate. The results of these tests are set forth in Table III.

TABLE III

| Example No. | Maximum change in EMF (mv.) | Time to reach maximum EMF (min.) |
|---|---|---|
| 11 | >450 | 0.5 |
| 12 | >450 | 23 |

Thus, both compositions produced a high oxidative shift in potential.

EXAMPLES 13, 14 AND 15

Another series of tests was conducted to demonstrate the effectiveness of different types of peroxy compounds in the composition of this invention. In this series of tests each composition evaluated comprised a peroxy compound, phthalic anhydride and sodium metasilicate, with the amount of phthalic anhydride and sodium metasilicate in each composition being sufficient to provide a concentration of 1.0 gm. per liter and 0.08 gm. per liter respectively. The peroxy compound in each composition was present in an amount equivalent, on a molecular weight basis, to a concentration of 1.0 gm. $NaBO_3 \cdot 4H_2O$ per liter. Each composition was added to 200 ml. of a 0.01 M $Na_2B_2O_4$ solution, at a temperature of 50° C., and subjected to the electrometric test described in Example 1.

The maximum EMF level obtained during the test and the time required to reach that level are set forth in Table IV for each of the compositions tested.

TABLE IV

| Example No. | Peroxy compound | Maximum EMF (mv.) | Time required (min.) |
|---|---|---|---|
| 13 | Hydrogen peroxide | 630 | 4 |
| 14 | Sodium carbonate peroxide ($2Na_2CO_3 \cdot 3H_2O_2$). | 460 | 4 |
| 15 | A combination of sodium peroxide and sodium tetraborate pentahydrate. | 330 | 7 |

Thus, each of the compositions tested produced a high oxidative shift in potential and reaches its peak of maximum oxidation potential within a relatively short period of time.

In summary, the composition of this invention, when added to an aqueous medium provides oxidative species of unexpectedly high oxidation potential, even at mild temperatures. Due to the formation of the high oxidation potential, the present composition is an effective oxidative bleach.

Although the present invention has been described and illustrated with a reference to specific examples, it will be understood that changes, modifications and variations of composition and procedure may be made by those skilled in the art within the principle and scope of the invention as set forth in the appended claims.

What is claimed is:

1. A method of increasing the oxidation potential of a water-soluble inorganic peroxy compound which is capable of forming hydrogen peroxide in a aqueous medium, which comprises incorporating with said peroxy compound in said aqueous medium at least one water-soluble alkali metal silicate in an amount sufficient to provide at least about 0.02 part by weight of said silicate per part by weight of said peroxy compound, and at least one organic acid anhydride selected from the group consisting of acetic anhydride, propionic anhydride, n-butyric anhydride, isobutyric anhydride, valeric anhydride, phthalic anhydride, glutaric anhydride, succinic anhydride and lower alkyl and halogen derivatives thereof which are capable of reacting with said peroxy compound in an aqueous medium to form a peracid and in a amount sufficient to provide from about 0.75 to about 10 parts by weight of said acid anhydride per part by weight of said peroxy compound.

2. The method defined in claim 1 in which said peroxy compound is selected from the group consisting of hydrogen peroxide; alkali metal and alkaline earth metal peroxides; alkali metal and alkaline earth metal perborates; salts of peroxyacids; and peroxyhydrates.

3. The method defined in claim 1 in which said alkali metal silicate is selected from the group consisting of sodium metasilicate, sodium orthosilicate, sodium sesquisilicate, sodium disilicate, potassium metasilicate and potassium disilicate.

4. The method defined in claim 1 in which said peroxy compound is sodium perborate, said silicate is sodium metasilicate and said acid anhydride is phthalic anhydride.

5. The method defined in claim 4 in which the amount of phthalic anhydride incorporated with said sodium perborate is sufficient to provide a 1:1 molar ratio of said anhydride to said perborate, and between about 0.02 to 0.1 part by weight of said sodium metasilicate per part by weight of said perborate is incorporated in said aqueous medium.

6. A composition which when added to an aqueous medium provides an oxidizing solution having a high oxidation potential, said composition consisting essentially of at least one water-soluble inorganic peroxy compound which is capable of forming hydrogen peroxide in an aqueous medium, at least one water-soluble alkali metal silicate in an amount sufficient to provide at least about 0.02 part by weight of said silicate per part by weight of said peroxy compound, and at least one organic acid anhydride selected from the group consisting of acetic anhydride, propionic anhydride, n-butyric anhydride, isobutyric anhydride, valeric anhydride, phthalic anhydride, glutaric anhydride, succinic anhydride and lower alkyl and halogen derivatives thereof which are capable of reacting with said peroxy compound in an aqueous medium to form a peracid of said acid anhydride, said anhydride being present in an amount sufficient to provide from about 0.75 to about 10 parts by weight of said acid anhydride per part by weight of said peroxy compound.

7. The composition defined in claim 6 in which said peroxy compound is selected from the group consisting of hydrogen peroxide; alkali metal and alkaline earth metal peroxides; alkali metal and alkaline earth metal perborates; salts of peroxyacids; and peroxyhydrates.

8. The composition as defined in claim 6 in which said alkali metal silicate is selected from the group consisting of sodium metasilicate, sodium orthosilicate, sodium sesquisilicate, sodium disilicate, potassium metasilicate and potassium disilicate.

9. The composition defined in claim 6 in which said peroxy compound is sodium perborate, said silicate is sodium metasilicate and said acid anhydride is phthalic anhydride.

10. The composition defined in claim 9 in which said composition contains a 1:1 molar ratio of said perborate and said phthalic anhydride and between 0.02 and 0.1 part by weight of said metasilicate per part by weight of said perborate.

11. The composition defined in claim 6 in which each of said peroxy compound, said silicate and said acid anhydride are in solid form to provide a solid composition containing less than sufficient available moisture to permit chemical reaction upon standing.

12. The composition defined in claim 6 in which said composition contains between about 10% and 60% by weight of said peroxy compound, between about 0.2% and 6% by weight of said alkali metal silicate and between about 30% and 90% by weight of said acid anhydride.

13. The composition defined in claim 12 in which said composition contains from about 5% to 80% by weight of an organic surface active agent having detergent properties.

14. The composition defined in claim 13 in which said surface active agent, said peroxy compound, said silicate and said acid anhydride are solids to provide a dry, free-flowing composition.

References Cited

UNITED STATES PATENTS

| 2,706,178 | 4/1955 | Young | 23—60 |
| 2,838,459 | 6/1958 | Sprout | 252—186 |
| 3,140,149 | 7/1964 | Habernickel | 252—186 |
| 3,298,775 | 1/1967 | Malafosse | 252—186 |

RICHARD D. LOVERING, Primary Examiner

I. GLUCK, Assistant Examiner

U.S. Cl. X.R.

8—111; 23—207.5; 252—95, 186